June 12, 1962     R. H. GRUBE     3,038,996
OBJECT LOCATING APPARATUS
Filed Aug. 7, 1958     4 Sheets-Sheet 1

INVENTOR.
ROBERT H. GRUBE
BY
*D. Gordon Angus*
ATTORNEY

June 12, 1962 R. H. GRUBE 3,038,996
OBJECT LOCATING APPARATUS
Filed Aug. 7, 1958 4 Sheets-Sheet 2
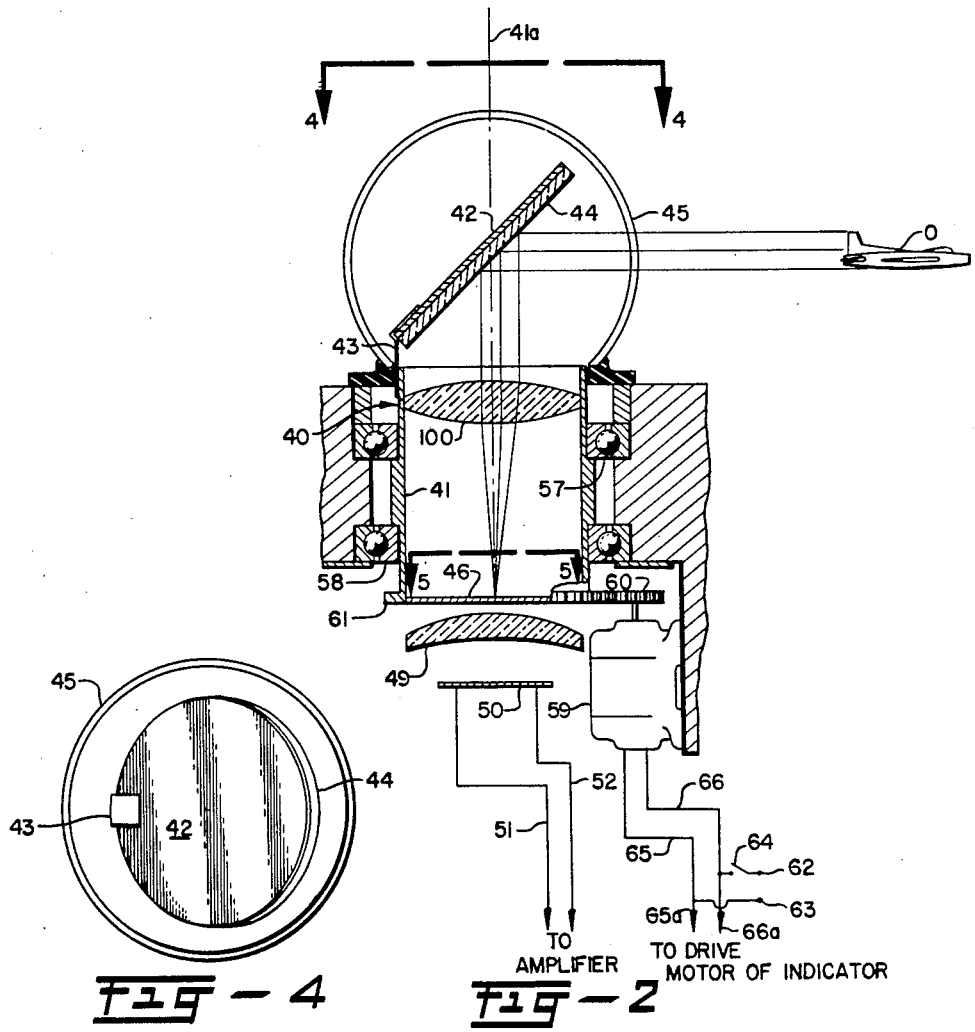
Fig-2
TO AMPLIFIER
TO DRIVE MOTOR OF INDICATOR
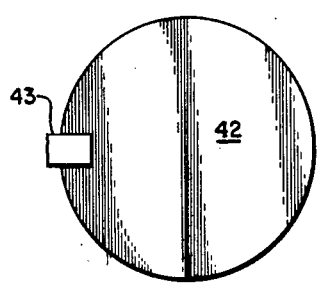
Fig-4
Fig-3
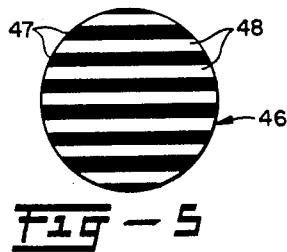
Fig-5
INVENTOR.
ROBERT H. GRUBE
BY
ATTORNEY June 12, 1962 R. H. GRUBE 3,038,996
OBJECT LOCATING APPARATUS
Filed Aug. 7, 1958 4 Sheets-Sheet 3

INVENTOR.
ROBERT H. GRUBE
BY
J. Gordon Angus
ATTORNEY

June 12, 1962  R. H. GRUBE  3,038,996
OBJECT LOCATING APPARATUS
Filed Aug. 7, 1958  4 Sheets-Sheet 4

INVENTOR.
ROBERT H. GRUBE
BY
D. Gordon Angus
ATTORNEY

United States Patent Office

3,038,996
Patented June 12, 1962

3,038,996
OBJECT LOCATING APPARATUS
Robert H. Grube, Pasadena, Calif., assignor to Aerojet-General Corporation, Azusa, Calif., a corporation of Ohio
Filed Aug. 7, 1958, Ser. No. 753,786
16 Claims. (Cl. 250—83.3)

This invention relates to indicators, and more particularly to indicators for giving a warning of the proximity of objects such as airplanes.

An object of the invention is to provide an indicator capable of giving a clear indication or signal of the proximity and direction of an object or airplane.

Systems are known for signaling the proximity and direction of objects; and they have been proposed for use in airplanes to signal the approach or proximity of other airplanes or objects. Such systems have commonly been known as proximity warning indicators. Typical systems of this character are described and claimed in my copending U.S. patent application Serial No. 753,787, filed concurrently herewith and in U.S. patent application Serial No. 753,785, filed concurrently herewith by R. W. Powell, both assigned to the same assignee as the present application. Such systems have ordinarily comprised a scanning device responsive to radiation, such as infrared radiation from an object or airplane whose proximity is to be detected, a detector sensitive to the received radiation and a visual indicator for indicating the direction of the object or airplane from the receiver.

The invention is carried out by provision of a plurality of scanners with different fields of view, and means for correlating the signals received to indicate the direction of the object.

A preferred feature of the invention resides in the use of an azimuth type of scanner and also one or more scanners which view a field in the form of a portion of a sphere such as hemispherical scanners.

Another preferred feature of the invention resides in the provision of an indicator which readily indicates whether the neighboring object or aircraft is above or below the receiver and also whether it is to the left or the right of the receiver.

The foregoing and other features of the invention will be better understood from the following detailed description and the accompanying drawings, of which:

FIG. 2 is a view partially in cross-section of one of the scanning devices used in the system of FIG. 1;

FIG. 3 is a view of a detail taken at line 3—3 of FIG. 2;

FIG. 4 is a view taken at line 4—4 of FIG. 2;

FIG. 5 is a face view of a reticle used in the arrangement of FIG. 2;

Figure 1:
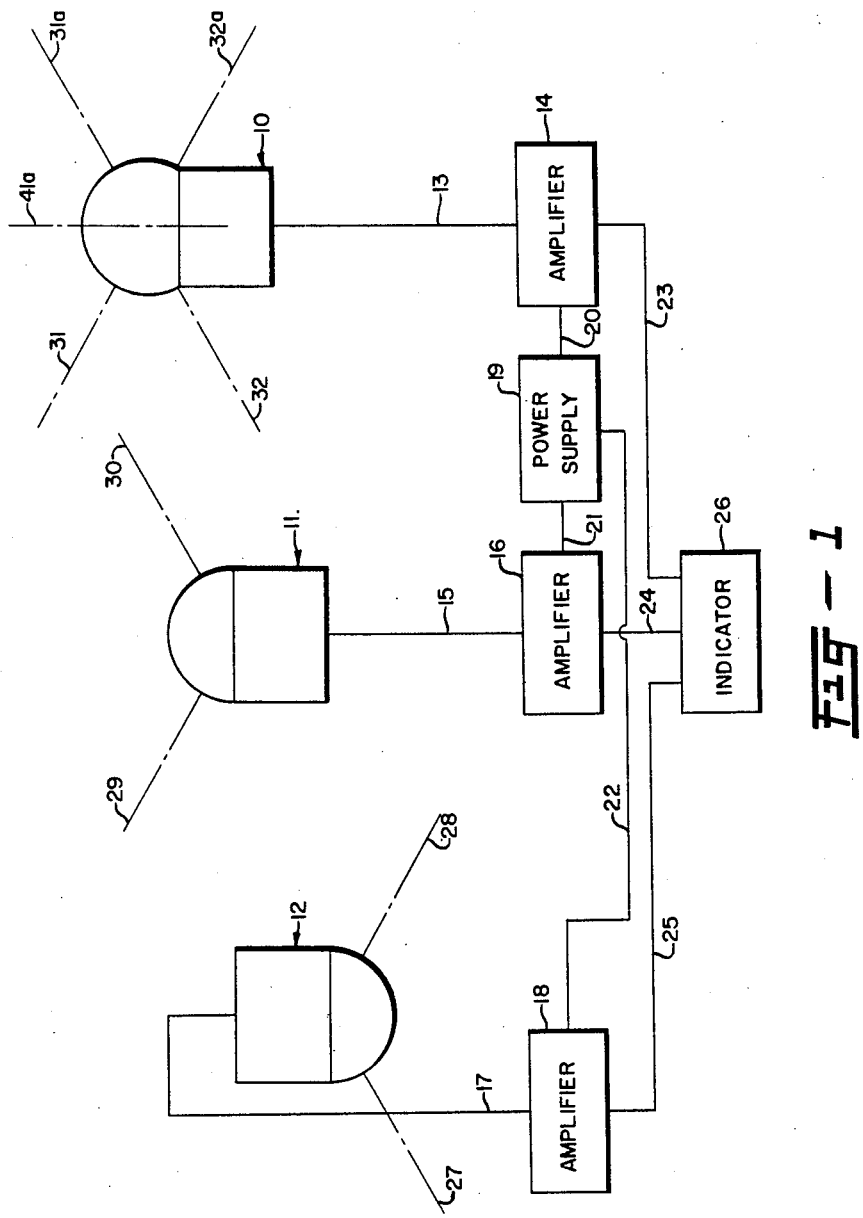
FIG. 1 is a diagrammatic illustration of a scanning and locating system in accordance with this invention.

In FIG. 1, there is shown schematically a system for detecting and indicating the presence and position of an object or aircraft. There are shown three scanning devices, 10, 11 and 12, respectively, each scanning a different field of view. It is understood that a detecting means is included in each of these scanning devices so as to produce an electrical output in response to radiant energy from the object. The output of scanner 10 is brought over an electrical line 13 to an amplifier 14; the output of scanner 11 is carried over a line 15 to an amplifier 16; and the output of scanner 12 is carried over a line 17 to an amplifier 18. The amplifiers are powered from a suitable source of power supply 19 over respective lines 20, 21 and 22. The outputs of all the amplifiers are carried over respective lines 23, 24 and 25 to an indicator 26. While all the electrical lines are shown in single line form, it will be understood that each line may actually comprise two wires or leads.

The field of scanner 12 is in the general form of a cone bounded by the lines 27 and 28; and the field of view of the scanner 11 is in the form of a similar cone bounded by the lines 29 and 30. Scanner 12 is thus viewing downwardly while scanner 11 is viewing upwardly. It will thus be recognized that while the two scanners 11 and 12 take care of the view upwardly and downwardly, they have a blind area in the azimuth direction; that is, in the region bounded by the path of lines 28, 30 and 27, 29. This is taken care of by the azimuth scanner 10 which scans all the way around in the azimuth direction. This field of view is within the upper cone shown by its extremities at lines 31, 31a and the lower cone formed by the extremity lines 32, 32a. Since lines 27, 30, 31a and 32 are all substantially parallel to each other and the lines 28, 29, 31 and 32a are all substantially parallel to each other, it will be seen that the three scanners view substantially all of the space in all directions.

The scanner 10 may be of the type described and claimed in my copending application Serial No. 753,787, filed concurrently herewith. Referring to FIG. 2, it comprises a rotatable scanner 40 having a hollow cylinder 41 having attached at its forward end a disc 42, by such means as a suitable bracket 43. The disc 42 is placed in a plane oblique to the axis of rotation 44 of the scanner. On the side of disc 42 toward the tube 41, there is placed a mirror 44. Partially surrounding the disc 42 and mirror 44 there is placed a hollow dome 45, preferably part of a sphere, of a material which is translucent to the rays to be detected. By translucent is meant its ability to transmit the waves of the radiant energy to be received.

Within the open end of tube 41 and facing the mirror 44 there is placed an objective lens system 100. It will be understood that while this is illustrated as a simple convex lens, it will ordinarily be a lens system. The lens system 100 will focus an image of the observed energy source at a focal plane at which is placed a reticle 46. The reticle is a disc-like structure set in the tube and may be of a desired configuration. A suitable form of reticle is shown in FIG. 5 which shows its face view.

It comprises a plurality of alternate opaque portions 47 and translucent portions 48, with respect to the radiant energy. Behind the reticle there is placed a field lens 49; and this ordinarily will be fixed in position and need not rotate with the scanner. While the field lens 49 is shown as a single lens, it will be understood that it may be a lens system. Behind the field lens 49 there is placed in fixed position a detector 50 which should be of a type sensitive to the radiant energy to be received. For detection of infrared radiation, a lead sulphide cell may be used. It will be understood that the optical elements, that is, the lenses, mirror and dome would be translucent or transparent to the radiant energy to be detected. For infrared energy a quartz glass may be used.

The tube 41 is mounted for rotation in suitable bearings 57 and 58; and for the purpose of producing the rotation there is provided a motor 59 having on its shaft a pinion 60 which meshes with a gear 61 mounted on the tube 41. The motor is driven from a suitable source of electric power from terminals 62, 63, through a switch 64 and conductors 65 and 66.

Figure 7:
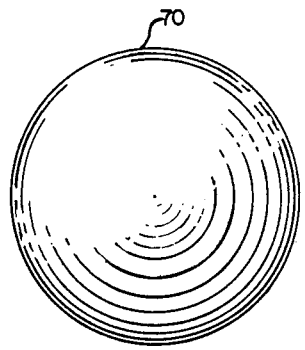
FIG. 7 is a view taken at line 7—7 of FIG. 6.
Figure 6:
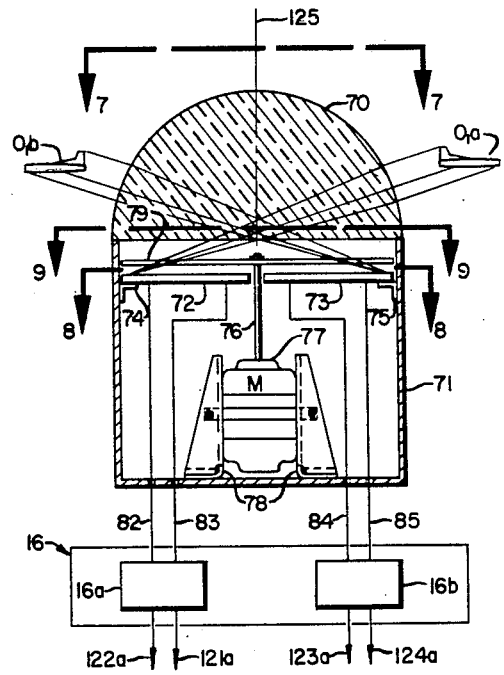
FIG. 6 shows partially in cross-section another scanning device used in the system of FIG. 1.
Figure 8:
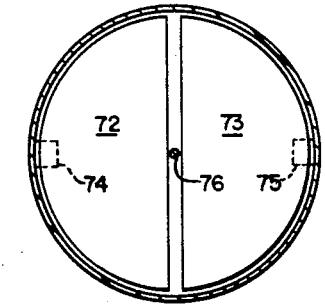
FIG. 8 is a cross-section view taken at line 8—8 of FIG. 6.
Figure 9:
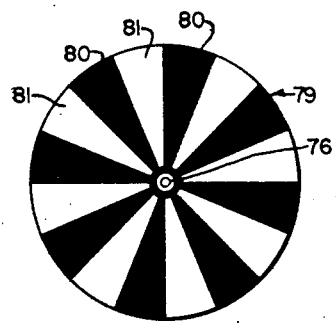
FIG. 9 is a face view of a reticle used in the system of FIG. 6.
Figure 10:
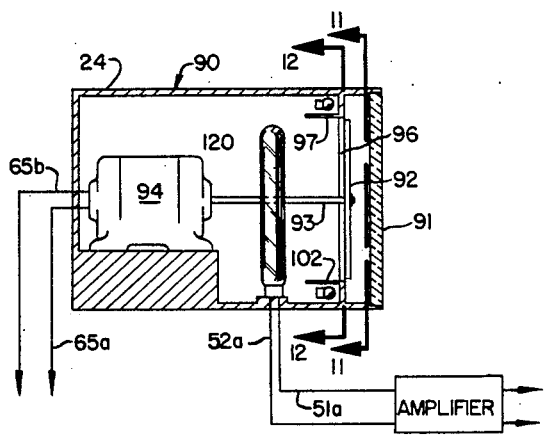
FIG. 10 is a cross-section view of an indicator used in the system of FIG. 1.
Figure 11:
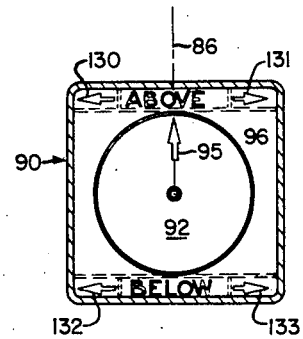
FIG. 11 is a cross-section view taken at line 11—11 of FIG. 10.
Figure 12:
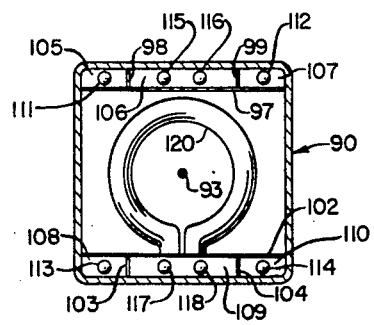
FIG. 12 is a cross-section view taken at line 12—12 of FIG. 10.

The viewers 11 and 12 of FIG. 1 may each be constructed as shown in FIGS. 6, 7 and 8. Referring to FIGS. 6 to 8, the device comprises a hollow dome 70 of a material transparent to the radiant energy mounted on the open end of a cylindrical opaque housing 71. Within the housing there are mounted two detectors 72 and 73 by respective brackets 74 and 75. These detectors are in the shape of wafers in the form of semi-circles, the edges constituting approximately the diameters of the circles, being spaced apart somewhat to allow room for a shaft 76 to protrude between them. The cells 72 and 73 should be sensitive to the radiant energy, such as lead sulphide cells, and should be insulated from each other and preferably from the housing 71. The motor 77 mounted within the housing by brackets 78 drives the shaft 76. There is fixed to the shaft 76 at the side of the cells 72 and 73 facing the globe 70, a reticle 79 which may conveniently be made in the form shown in FIG. 9. FIG. 9 shows that the disc constituting the reticle is made up of pie-shaped alternate opaque areas 80 and transparent areas 81. When the motor is driven by a source of power (not shown), the reticle disc will correspondingly rotate. It should be understood, however, that the provision of the motor, shaft and reticle is optional; and although it will be generally preferred, it is possible to use the system without them.

The output of detector 72 is taken over leads 82 and 83 to the input of an amplifier 16a which will be part of the amplifier numbered 16 in FIG. 1. Likewise the output of detector 73 will be taken over leads 84 and 85 to the input of an amplifier 16b, which will be another part of the amplifier 16 shown in FIG. 1. It will be recognized that in the diagram of FIG. 1, the line 15 is representative of the four leads 82, 83, 84 and 85 of FIG. 6.

In using the device of FIG. 6 as the viewer 12 of FIG. 1, the viewer will be inverted relative to its position shown in FIG. 6. Otherwise, the circuits can be the same, in which case the line 17 of FIG. 1 will be composed of leads 82, 83, 84 and 85 of FIG. 6 and will connect with respective amplifier parts such as 16a and 16b as in FIG. 6. In this case the amplifier 18 of FIG. 1 will be composed of these amplifiers 16a and 16b.

The power source for the amplifiers of FIG. 6 is not shown, but it will be understood that a suitable source of power will be supplied as indicated schematically by the power supply 19 and corresponding leads in FIG. 1.

The indicating device 26 of FIG. 1 may be a composite visual indicator constructed as shown in FIGS. 10 to 13. Referring to FIGS. 10 to 13, the apparatus is mounted in a housing 90 which is an enclosure closed in on all sides by opaque walls except for one side which is covered by a visually transparent or translucent wall or glass 91. Behind the transparent plate 91 there is located a disc 92 which is opaque to visible light. The disc is mounted on a shaft 93 driven by a motor 94; and a suitable gear train (not shown) may, if desired, be provided between the motor shaft and the shaft 93 of the disc. The disc 92 is provided with a suitable opening 95 through it so that visible light can pass through this opening. The opening 95 is shown in the shape of an arrow, but it will be understood that some other shape or form of opening may be used, so long as it is located off the center of rotation of the disc. The rotatable disc 92 is placed within the opening of an opaque baffle 96. Behind this baffle there is provided an arrangement of compartments containing lights. An upper set of compartments is formed by a strip 97, and a pair of strips 98 and 99 parallel to each other and perpendicular to the strip 97, which extends between the strip 97 and the side of the enclosure. Similarly, a lower set of compartments is formed by a strip 102 parallel to strip 97 and a pair of strips 103 and 104 parallel to each other and perpendicular to strip 102 and extending between strip 102 and the adjacent side of the enclosure. There are thus formed three upper compartments 105, 106 and 107 and three lower compartments 108, 109 and 110. Each of these compartments contains one or more electric lights. Thus compartments 105, 107, 108 and 110 each contain an electric light numbered 111, 112, 113 and 114, respectively; and compartments 106 and 109 each contain a pair of lights, 115, 116 and 117, 118, respectively.

Within the housing and behind the disc 92, there is placed a lamp 120 powered by electrical leads 51a and 52a which are for connection to leads 51 and 52 respectively of FIG. 2. Thus, lamp 120 will light up momentarily at times when detector 50 is energized.

The baffle 96 is opaque except that it is provided with openings or transparent portions in the form of symbols or words where it covers the compartments. Compartments 105, 107, 108 and 110 each contain the symbol of an arrow, these arrows being numbered 130, 131, 132 and 133 respectively, while compartment 106 bears the word "Above" and compartment 109 bears the word "Below." Whenever the light is lit in one of the compartments, the symbol or word of the compartment is visible through the transparent plate 91. The arrangement of the lights in the respective compartments is such that light from one compartment is not substantially reflected to other compartments.

Figure 13:
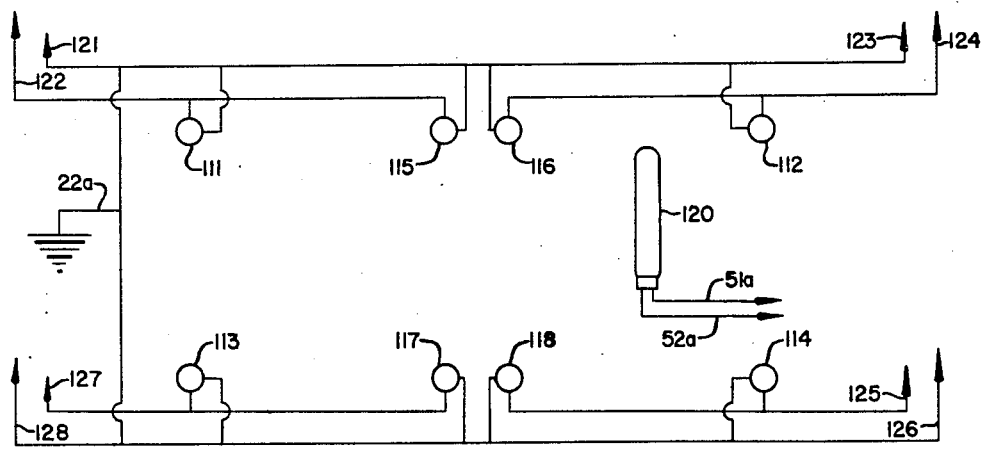
FIG. 13 is a wiring diagram of a lamp system used in the indicator of FIG. 10.

The electrical circuitry for the lamps is shown in FIG. 13. In FIG. 13, the leads 121 and 122 are for connection with respective leads 121a and 122a from the output of amplifier 16a in FIG. 6; and the leads 123 and 124 of FIG. 13 are for connection to the corresponding leads 123a and 124a from the output of amplifier 16b in FIG. 6. It will be recognized that leads 121 and 123 are in effect the same lead which is shown grounded in FIG. 13. By this arrangement, when lead 122 is energized from detector 72 of FIG. 6, the lamps 116 and 112 will light up; and correspondingly, when lead 124 is energized from its respective detector 73 of FIG. 6, the lamps 111 and 115 will light up. Accordingly, an object $O'_a$ located well to the right of the vertical 125, but within the field of view of scanner 11 (FIG. 6), will energize detector 72 and thereby produce lighting of lamps 116 and 112. Correspondingly when an object is at the position of $O'_b$, well to the left of the vertical line 125, the lamps 111 and 115 will be lighted. The reason for this is that the relation of the dome 70 to the positions of the detectors 72 and 73 beneath it, does not permit radiation from an object well to the right of the vertical to impinge on detector 73, but does permit it to impinge on detector 72. Similarly radiation from an object well to the left of the vertical impinges on detector 73 but not on detector 72. An object substantially overhead, that is, near the vertical line 125, will have its radiation impinge on both detectors 72 and 73 in which case all the lights 111, 115, 116 and 112 will be lighted.

The lamps 113, 117, 118 and 114 will be lighted in a similar manner in response to the pair of detectors of scanner 12. Thus, assuming that scanner 12 is the same as the scanner shown in FIG. 6 except that it is inverted relative to FIG. 6, the leads 125 and 126 will be connected respectively to leads 121a and 122a of FIG. 6; and the leads 127 and 128 will be connected respectively to the leads 123a and 124a of FIG. 6. In this manner, the lamps 113 and 117 will be lighted by radiation from an object below and to the left of the vertical of the scanner and lamps 114 and 118 will be lighted in response to radiation from an object below and to the right of the vertical.

For the sake of completion of the wiring of the lamps, the lamp 120 is shown in FIG. 13, with its leads 51a and 52a to be connected to respective leads 51 and 52 of FIG. 2 as described hereinabove.

The motor 94 which drives the disc 92 is driven from power leads 65a and 65b, which will connect with and be the same as numbered leads of FIG. 2. Thus, motor 94 is driven from the same power terminals 62, 63 as powers the motor 59 of FIG. 2; and the two motors rotate in synchronism. The desired relative angularity between the tube 41 and disc 92 can be maintained in any suitable manner. For example, assuming the power source at terminals 62, 63 to have a given frequency, and assuming motors 59 and 94 to be synchronously operated, the speed of the two motors can be made the same. If then the gear ratio between the shaft of motor 59 and the tube 41 be the same as that between motor 94 and shaft 93 the desired angularity can be maintained. Any other suitable means for maintaining the proper angular positions of the tube 41 and disc 92 will suffice.

To operate the system, the shaft 93 and tube 41 are caused to rotate at the same speed and in synchronism with each other. This will cause the mirror 44 and disc 92 to rotate at the same speed. Referring to FIG. 1, the field of view of the mirror will be bounded by lines 31 and 32, and as the mirror rotates, this field of view will rotate about the axis of rotation 41a so that when the mirror is facing in the opposite direction from that for which the lines 31 and 32 are boundaries, the field of view will be bounded by lines 31a and 32a.

Any object O within the field of view of the rotating mirror, which radiates energy of the type to which the detector is sensitive will thus produce a response of the detector. The arrow 95 of disc 92 will become illuminated at the angular position corresponding to the position of the object in the azimuth direction. Assuming that disc 92 of the indicator is placed substantially in an azimuth plane, the arrow 95 will become illuminated at the angular position at which the arrow points substantially to the object, if it be assumed that the housing be oriented in an angular position corresponding to that of the scanner of FIG. 2. The illumination of the arrow will be by a series of repetitive light flashes occurring once for each rotation of disc 92 at the angular position of the object. It will be understood, of course, that the indicator may be placed in any position or plane, in which case the direction of the illuminated arrow will indicate the direction of the object although the arrow may not point directly to it in space.

If an object be located within the field of view of either scanner 11 or scanner 12, the corresponding insignia of the indicator will become illuminated. Thus, the radiating object within the field of view of scanner 11 will illuminate the word "Above" by reason of the illumination of one or both of lamps 115 and 116; and if the object be substantially to the right of the vertical, the arrow 131 will be illuminated by reason of the illumination of lamp 112 in addition to the illumination of lamp 116. If the radiating object be substantially to the left of the vertical, the arrow 130 will become illuminated by reason of the illumination of lamp 111 in addition to the illumination of lamp 115. Likewise, a radiating object within the field of view of scanner 12 will illuminate the word "Below" by reason of the illumination of one or both of lamps 117 and 118 and if the object be substantially to the right of the vertical the arrow 133 will become illuminated by reason of the illumination of lamp 114, in addition to the illumination of lamp 118. If the object be substantially to the left of the vertical, the arrow 132 will become illuminated by reason of the illumination of lamp 113 in addition to the illumination of lamp 117.

It will be recognized that by the present invention there is provided a simple and effective system for locating objects in space, both above, below and all around the scanning equipment. Ordinarily the several scanners or viewers such as the three scanners shown in FIG. 1 will be located in close proximity to each other, as for example in an airplane. The mere fact that the several scanners may be located several feet of yards apart from each other will not adversely affect the results of the system.

While the invention has been described and illustrated with reference to the specific embodiments shown in the drawings, it should be understood that the invention is not limited to these specific embodiments or specific components used in them, as modifications within the scope of the invention may occur to those skilled in the art. For example, the optical scanning and viewing device shown in FIG. 2 of the drawings may be modified within the scope of the invention to suit particular circumstances; and the invention is not limited to use of this particular scanning device. Moreover, the invention is not limited to use of the particular scanner shown in FIG. 6, as other scanning means capable of viewing the space above and below may occur to those skilled in the art. Furthermore, the invention is not limited to use of the particular visual indicating arrangement shown in FIGS. 10 to 12 for the purpose of visually indicating the angular position of the objects in space. Variations and modifications of such indicating emans may occur to those skilled in the art; and it should be understood that other means for exhibiting a visible indication of the detector responses and for rotating visual exhibiting means in synchronism with the rotating optical viewer of FIG. 2 may be used within the scope of the invention. The invention is not limited except in accordance with the scope of the appended claims.

What is claimed is:

1. A system for locating the position of an object from which wave energy is being radiated, comprising a plurality of scanners, each of which views a region in space, a first of said scanners having a field of view throughout an angle of 360 degrees in the azimuth direction, and a second of said scanners having a field of view in the form of at least a portion of a sphere the last-mentioned field of view covering a region in space outside the field of view of the first scanner, a first detector responsive to wave energy received by the first scanner, a second detector responsive to wave energy received by the second scanner, and indicating means responsive to the outputs of said detectors, said indicating means comprising a visual indicator responsive to the first detector and a visual indicator responsive to the second detector.

2. Apparatus according to claim 1 in which the optical axis of the scanner having the spherical view is substantially vertical.

3. A system for locating the position of an object from which wave energy is being radiated comprising a plurality of scanners each of which views a region in space, a first of said scanners having a viewer with an optical axis which sweeps in a substantially horizontal plane about a substantially vertical axis, the upper and lower boundaries of the field of view swept by said viewer comprising cones having their apices at said axis, one of said cones being located above the other, the upper cone flaring upwardly and the lower cone flaring downwardly, a second of said scanners having a viewer with a substantially vertical optical axis and having a field of view within a cone having its apex at the last-mentioned optical axis, a first detector means responsive to wave energy received by the first scanner, a second detector means responsive to wave energy received by the second scanner, and indicating means responsive to the outputs of said detectors, said indicating means comprising a visual indicator responsive to the first detector and a visual indicator responsive to the second detector.

4. A system according to claim 3 in which the cone bounding the field of view of the second scanner substantially coincides with one of said cones bounding the field of view of the first scanner.

5. A system according to claim 3 in which the second detector means comprises two electrically separated parts located side by side and on opposite sides of the vertical optical axis of said second scanner so that each part receives wave energy from an object at one side of the last-mentioned axis, and the visual indicator responsive to said second detector comprises a first indicating device responsive to one of said parts and a second indicating device responsive to the other of said parts.

6. A system for locating the position of an object from which wave energy is being radiated comprising three scanners each of which views a region in space, a first of said scanners having a viewer with an optical axis which sweeps in a substantially horizontal plane about a substantially vertical axis, the upper and lower boundaries of the field of view swept by said viewer comprising cones having their apices at said axis, one of said cones being located above the other, the upper cone flaring upwardly, and the lower cone flaring downwardly, a second of said scanners having a viewer with a substantially vertical axis and having a field of view within a cone having its apex at the last-mentioned optical axis, and flaring upwardly, the third of said scanners having a viewer with a substantially vertical optical axis and having a field of view within a cone having its apex at the last-mentioned optical axis and flaring downwardly, a first detector means responsive to wave energy received by the first scanner, a second detector means responsive to wave energy received by the second scanner, a third detector means responsive to wave energy received by the third scanner, and indicating means responsive to the outputs of said detectors, said indicating means comprising a visual indicator responsive to the first detector, a visual indicator responsive to the second detector, and a visual indicator responsive to the third detector.

7. A system according to claim 6 in which the cone bounding the field of view of the second scanner substantially coincides with the upper cone bounding the field of view of the first scanner, and the cone bounding the field of view of the third scanner substantially coincides with the lower cone bounding the field of view of the first scanner.

8. A system for locating the position of an object from which wave energy is being radiated, comprising a plurality of scanners, each of which views a region in space, a first of said scanners comprising a wave deflector rotatable about an axis of rotation, a detector which develops an electrical response to the wave energy reflected from said deflector, means exhibiting a visible indication of the detector response, and means rotating the exhibiting means in synchronism with the rotatable deflector, said axis of rotation being on a substantially vertical axis and the deflector being angularly related to said axis to provide a field of view which sweeps around the azimuth, the upper and lower boundaries of said field of view comprising cones having their apices at said axis of rotation, one of said cones being located above the other, the upper cone flaring upwardly and the lower cone flaring downwardly, the second of said scanners having a viewer with a substantially vertical optical axis and having a field of view within a cone having its apex at the last-mentioned optical axis, the cone bounding the field of view of the second scanner substantially coinciding with one of said cones bounding the field of view of the first scanner, a second detector means responsive to wave energy received by said second scanner and visual indicating means responsive to the output of said second detector.

9. A scanning device for locating the presence of an object from which wave energy is being radiated, comprising a lens having an optical axis, a pair of detectors positioned to receive wave energy passing through said lens from the object, one of said detectors receiving energy from one side of said optical axis, and the other of said detectors receiving energy from the the other side of said optical axis, and an indicating means responsive to the output of each of said detectors.

10. Apparatus according to claim 9 in which a rotatable reticle is located between the detectors and the lens.

11. A scanning device for locating the presence of an object from which wave energy is being radiated, comprising a lens with a sperical surface having an optical axis through it, and a pair of detectors responsive to the wave energy, located at the opposite side of the lens from the spherical surface.

12. A device according to claim 11 in which one of the detectors receives wave energy through the lens from one side of the optical axis and the other detector receives wave energy through the lens from the other side of the optical axis.

13. Apparatus according to claim 11 in which a rotatable reticle is located between the detectors and the lens.

14. A scanning system for locating the presence of an object from which wave energy is being radiated, comprising a viewer having a field of view in an upward direction, a second viewer having a field of view in a downward direction, each of said viewers having detecting means responsive to the wave energy received by the viewer, and visual indicating means responsive to the respective detectors, whereby an indication is given of whether the object is above or below the scanning system.

15. A system according to claim 14 which includes a third viewer having a field of view through 360 degrees in the azimuth direction, and an indicator which gives a visible response at an angular position corresponding to the angular position of the object from the third viewer.

16. A scanning system for locating the presence of an object from which wave energy is being radiated, comprising a first viewer having an optical axis and a field of view extending in an upward direction, a second viewer having an optical axis and a field of view extending in a downward direction, each of said viewers having two detectors, one of which receives wave energy from one side of the optical axis of its viewer and the other of which receives wave energy from the other side of the optical axis of its viewer, and a visual indicating means responsive to each of the detectors, whereby visible indication is given of whether the object is above or below the scanning system and whether it is to one side or the other of the optical axes.

References Cited in the file of this patent

UNITED STATES PATENTS

| 2,262,942 | Jones | Nov. 18, 1941 |
| 2,392,873 | Zahl | Jan. 15, 1946 |
| 2,431,625 | Tolson | Nov. 25, 1947 |